United States Patent
Stork et al.

(10) Patent No.: US 6,492,981 B1
(45) Date of Patent: *Dec. 10, 2002

(54) CALIBRATION OF A SYSTEM FOR TRACKING A WRITING INSTRUMENT WITH MULTIPLE SENSORS

(75) Inventors: David G. Stork, Portola Valley, CA (US); Michael Angelo, Redwood City, CA (US); Gregory J. Wolff, Mountain View, CA (US)

(73) Assignee: Ricoh Company, Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/721,045

(22) Filed: Nov. 21, 2000

Related U.S. Application Data

(63) Continuation of application No. 08/999,010, filed on Dec. 23, 1997, now Pat. No. 6,181,329.

(51) Int. Cl.[7] .............. G09G 5/00; G08C 21/00; G06E 15/00
(52) U.S. Cl. .............. 345/179; 178/19.01; 702/150
(58) Field of Search .............. 33/431; 73/1.75, 73/1.78, 1.79, 767; 318/582; 701/200, 207, 213, 216, 300; 340/988; 342/76; 116/209; 345/158; 702/150, 151, 152, 153, 154; 178/18.01

(56) References Cited

U.S. PATENT DOCUMENTS

| | | |
|---|---|---|
| 3,906,444 A | 9/1975 | Crane et al. |
| 3,915,015 A | 10/1975 | Crane et al. |
| RE29,765 E | 9/1978 | Crane et al. |
| 4,241,409 A | 12/1980 | Nolf |
| 4,345,239 A | 8/1982 | Elliott |
| 4,468,694 A | 8/1984 | Edgar |
| 4,513,437 A | 4/1985 | Chainer et al. |
| 4,545,018 A | 10/1985 | Clements et al. |
| 4,561,105 A | 12/1985 | Crane et al. |
| 4,646,073 A | 2/1987 | Fukunaga et al. |
| 4,731,857 A | 3/1988 | Tappert |
| 4,737,773 A | 4/1988 | Kobayashi |

(List continued on next page.)

FOREIGN PATENT DOCUMENTS

| | | |
|---|---|---|
| WO | WO93/08542 | 4/1993 |
| WO | WO94/09447 | 4/1994 |
| WO | WO94/18663 | 8/1994 |
| WO | WO95/21436 | 8/1995 |
| WO | WO96/14633 | 5/1996 |

OTHER PUBLICATIONS

"Digital pen recalls what it has written"—by Michele Clarke—Magazine article.

(List continued on next page.)

Primary Examiner—Steven Saras
Assistant Examiner—Paul A. Bell
(74) Attorney, Agent, or Firm—Blakely, Sokoloff, Taylor & Zafman LLP

(57) ABSTRACT

One embodiment of the writing instrument described herein comprises a pen-like device containing three accelerometers and three gyroscopes. Data from these sensors are processed via an Euler transform. Prior to using the writing instrument, the user holds the writing instrument in multiple predefined positions and sensor readings are taken. The sensor readings are mapped to the corresponding predefined positions. In addition, the sensor readings are compared to expected sensor readings to compensate for environmental variations such as altitude or temperature as well as for the possible tilt of a writing surface. The sensor readings are interpolated to map sensor readings other than those at the predefined positions to other writing instrument positions. When the user writes with the writing instrument, sensor outputs are used to track the writing instrument to define strokes made by the user. The data describing the strokes may be stored or processed to accomplish a variety of tasks including faxing a message, recording information, etc.

10 Claims, 3 Drawing Sheets

U.S. PATENT DOCUMENTS

| | | | |
|---|---|---|---|
| 4,751,741 A | | 6/1988 | Mochinaga et al. |
| 4,787,051 A | | 11/1988 | Olson |
| 4,806,707 A | | 2/1989 | Landmeier |
| 4,856,077 A | | 8/1989 | Rothfjell |
| 4,883,926 A | | 11/1989 | Baldwin |
| 4,988,981 A | | 1/1991 | Zimmerman et al. |
| 5,022,086 A | | 6/1991 | Crane et al. |
| 5,025,314 A | | 6/1991 | Tang et al. |
| 5,027,115 A | | 6/1991 | Sato et al. |
| 5,159,321 A | | 10/1992 | Masaki et al. |
| 5,164,585 A | | 11/1992 | Lieu |
| 5,181,181 A | * | 1/1993 | Glynn ................ 345/163 |
| 5,215,397 A | | 6/1993 | Taguchi et al. |
| 5,226,091 A | | 7/1993 | Howell et al. |
| 5,227,622 A | | 7/1993 | Suzuki |
| 5,239,292 A | | 8/1993 | Willan |
| 5,247,137 A | * | 9/1993 | Epperson ............. 178/19.04 |
| 5,294,792 A | | 3/1994 | Lewis et al. |
| 5,296,871 A | | 3/1994 | Paley |
| 5,371,516 A | | 12/1994 | Toyoda et al. |
| 5,373,857 A | * | 12/1994 | Travers et al. .......... 702/154 |
| 5,396,265 A | | 3/1995 | Ulrich et al. |
| 5,408,382 A | | 4/1995 | Schultz et al. |
| 5,414,227 A | * | 5/1995 | Schubert et al. ........ 178/19.01 |
| 5,434,371 A | | 7/1995 | Brooks |
| 5,436,792 A | | 7/1995 | Leman et al. |
| 5,440,326 A | | 8/1995 | Quinn |
| 5,444,192 A | | 8/1995 | Shetye et al. |
| D362,663 S | | 9/1995 | Nguyen |
| 5,471,226 A | | 11/1995 | Suzuki et al. |
| 5,477,012 A | | 12/1995 | Sekendur |
| 5,506,605 A | | 4/1996 | Paley |
| 5,512,892 A | | 4/1996 | Corballis et al. |
| 5,517,579 A | | 5/1996 | Baron et al. |
| 5,526,018 A | | 6/1996 | Fisher |
| 5,548,092 A | | 8/1996 | Shriver |
| 5,558,091 A | * | 9/1996 | Acker et al. .............. 600/424 |
| 5,570,109 A | | 10/1996 | Jenson |
| 5,583,323 A | | 12/1996 | Zurstadt et al. |
| 5,587,558 A | * | 12/1996 | Matsushima ............ 178/18.01 |
| 5,587,560 A | | 12/1996 | Crooks et al. |
| 5,657,054 A | | 8/1997 | Files et al. |
| 5,703,623 A | * | 12/1997 | Hall et al. ................ 345/158 |
| 5,751,276 A | | 5/1998 | Shih |
| 5,777,898 A | | 7/1998 | Teterwalk |
| 5,819,206 A | * | 10/1998 | Horton et al. ............ 702/150 |
| 5,902,968 A | * | 5/1999 | Sato et al. ............... 178/19.01 |
| 5,953,683 A | * | 9/1999 | Hansen et al. ............ 702/150 |
| 6,029,111 A | * | 2/2000 | Croyle .................... 701/207 |
| 6,134,506 A | * | 10/2000 | Rosenberg et al. ........ 702/152 |

OTHER PUBLICATIONS

"Atypical mice and related devices", Computer, IEEE Computer Society, Jun. 1995, vol. 28, No. 26, Product Reviews, pp. 92 and 94.

1997 International Conference on Communications, Chicago, IL, USA.—"Electronic Blackboard Will Travel"—by GP Torok—pp. 19.1–5, 19.1–23 through 19.1–25.

Aeropoint User's Guide—Creative Lab—copyright Oct. 1994—pp. 1–1 and 1–3.

"The DataPen" User's Guide—Primax Electronics Ltd.—p. 1.

* cited by examiner

CALIBRATION OF A SYSTEM FOR TRACKING A WRITING INSTRUMENT WITH MULTIPLE SENSORS

REFERENCE TO RELATED APPLICATION

This application is a continuation of application Ser. No. 08/999,010 filed Dec. 23, 1997 now U.S. Pat. No. 6,181,329.

FIELD OF THE INVENTION

The present invention relates to tracking the position of a writing instrument, and more specifically, to calibrating a system that tracks the position of writing instrument.

BACKGROUND OF THE INVENTION

In the prior art, a number of input devices exist that allow a user to provide input to a computer or similar device. Typically, these input devices (i.e., a mouse, a touch sensitive screen or pad) are physically connected to the computer and do not allow a user to simply write the input as he or she would with a writing instrument such as a pen or a pencil. For some activities, such as sending a facsimile (faxing) or making an entry in an appointment book, it would be simpler for a user to write out a message or entry as he or she would with a writing instrument that is not physically connected to the computer rather than use prior art input devices to create a message for faxing or to enter an appointment.

In order to provide the user with a writing instrument as an input device, a system for tracking position(s) of a writing instrument must be provided. This system monitors movements of the writing instrument and converts these movements into a representation of the user input. The better the tracking system, the more accurately the user input is received. However, because the writing instrument may be used in many different environments where conditions such as altitude and temperature vary, the tracking system to track the position of the writing instrument may not perform accurately, resulting in the receipt of incorrect input. Therefore, it is desirable to calibrate the writing instrument for the environment in which the writing instrument is used.

SUMMARY OF THE INVENTION

A method and apparatus for calibrating a system that tracks the position of a writing instrument is disclosed. Multiple sensors generate outputs based on a position of the writing instrument. Sensor readings are obtained for multiple predefined positions of the writing instrument. A mapping of sensor outputs to writing instrument positions is generated based on the sensor readings at the predefined positions.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
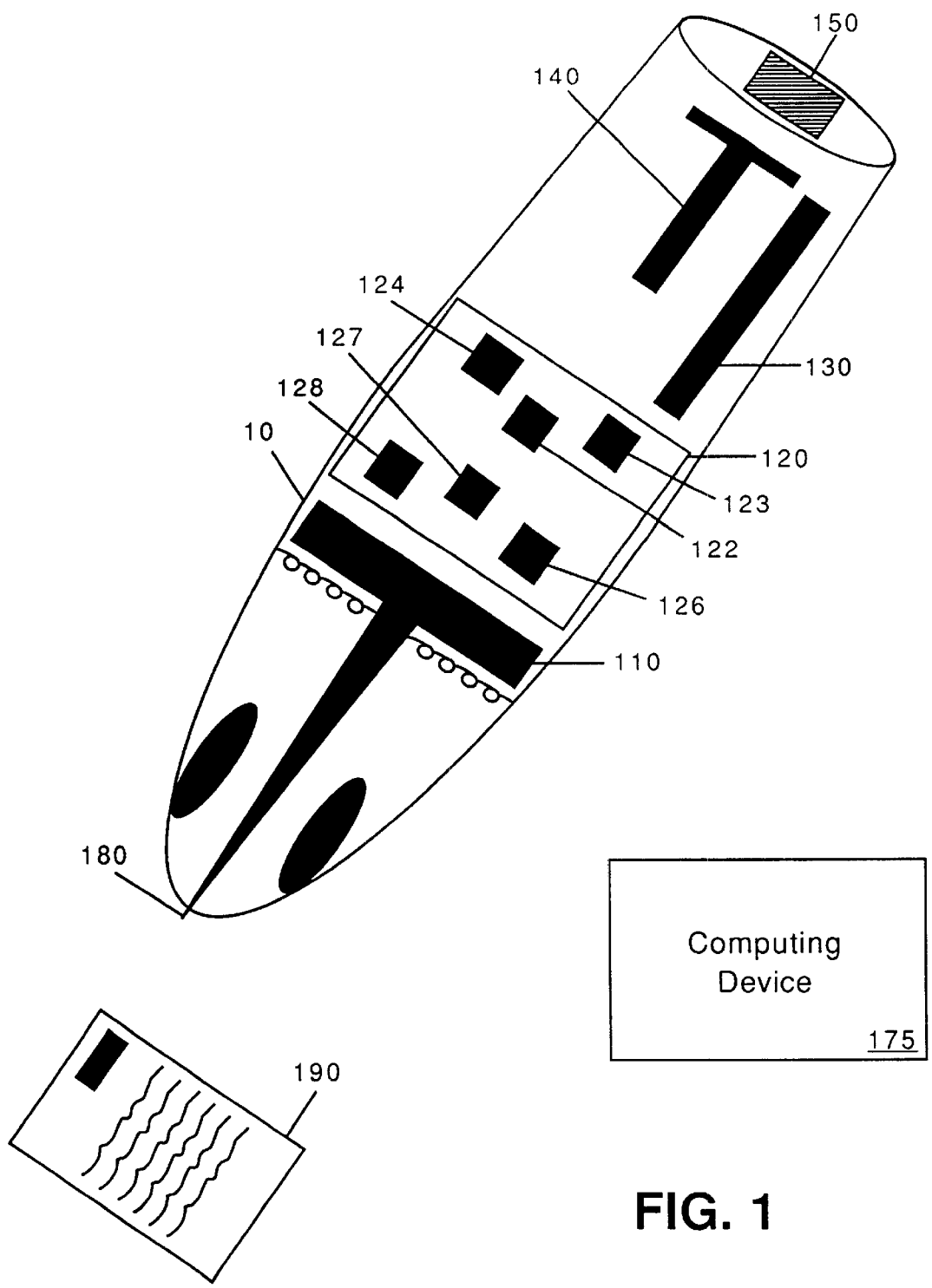
FIG. 1 is one embodiment of a writing instrument tracked by a tracking system that may be calibrated according to the present invention.

A method and apparatus for calibrating a system that tracks the position of an input device such as a writing instrument is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid obscuring the present invention.

The tracking system described herein may be used, for example, to track the position of a writing instrument such as a pen-based faxing device disclosed in a patent application entitled "METHOD AND APPARATUS FOR PEN-BASED FAXING," filed Sep. 30, 1997, application Ser. No. 08/940,832, now U.S. Pat. No. 6,201,903, or a data-entry device, such as disclosed in a patent application entitled "MANUAL ENTRY INTERACTIVE PAPER AND ELECTRONIC DOCUMENT HANDLING AND PROCESSING SYSTEM," filed Nov. 1, 1995, application Ser. No. 08/551,535, now U.S. Pat. No. 6,081,261, both of which are assigned to the corporate assignee of the present invention. Such writing instruments allow a user to write as he or she normally would write and the strokes made by the user are sent as a fax in the case of pen-based faxing or the strokes may be used for data entry in the case of the data entry device.

Of course, other uses for the position, tracking system of the present invention are also possible. For example, a wireless pointing device such as the device disclosed in a patent application entitled "DIRECT POINTING APPARATUS FOR DIGITAL DISPLAYS," application Ser. No. 08/840,552, filed Apr. 18, 1997, now U.S. Pat. No. 6,104,390, assigned to the corporate assignee of the present invention, may have a tracking system calibrated according to the present invention. Such a pointing device is not used for writing messages, but instead performs precise tracking to accurately place a cursor on a display.

In order to provide a writing device as described above, a method and apparatus is provided to calibrate the system that tracks position(s) of the writing instrument. In order to simplify the description of the present invention, a writing instrument is described. However, as to the description of the sensors and calibration of the system, the description applies equally to other embodiments, such as a cursor control device.

One embodiment of the writing instrument described herein comprises a pen-like device containing three acceleration sensors (accelerometers) and three angular velocity sensors (gyroscopes). Data from these sensors are processed via an Euler transform. Prior to using the writing instrument, the user holds the writing instrument in multiple predefined positions. Sensor readings are taken and mapped to the corresponding predefined positions. In other words, sensor outputs (e.g., voltage levels) are defined as the predefined positions by the tracking system. In addition, the sensor readings are compared to expected sensor readings to compensate for environmental variations such as altitude or temperature as well as for the possible tilt of a writing surface. After calibration, sensor readings other than those at the predefined positions are mapped to corresponding positions by interpolating the sensor outputs obtained at the predefined positions. The mapping of sensor outputs allows tracking of the position of the writing instrument for positions other than the predefined positions.

When the user writes with the writing instrument, sensor outputs are used to track the position of the writing instrument to define strokes made by the user. The data describing the strokes may be stored or processed to accomplish a variety of tasks including those discussed above, such as faxing a message, recording information, such as, for example, an appointment or other tasks. In one embodiment, the stroke data comprises graphical representations of the strokes actually made with the writing instrument rather than stored characters or templates, as with an optical character recognition (OCR) or similar device. Processing of the stroke data may occur within the writing instrument or at a remote computing device.

The Writing Instrument

One embodiment of a writing instrument having multiple sensors according to the present invention is briefly described. It should be noted, however, that the writing instrument is not required to make a physical mark of any kind. Any device that allows a user to make writing motions that are to be tracked may be used. Additionally, because the actual strokes that the user makes are tracked and processed, the quality of the user's handwriting is not important.

FIG. 1 is one embodiment of writing instrument 10 whose position may be tracked according to the present invention. The lower portion of writing instrument 10 generally comprises, ink supply 110, and pen tip 180. As noted above, writing instrument 10 is not required to actually mark a surface such as writing surface 190. Thus, ink supply 110 is only included when a pen-type writing instrument is required or discussed. Writing surface 190 may be a plain piece of paper, a specially formatted document, or any other type of writing surface.

In one embodiment, the upper portion of writing instrument 10 comprises tracking sensors 120, battery 130, transceiver 140 and a light emitting diode (LED) or liquid crystal display (LCD) 150. In one embodiment, tracking sensors 120 comprise three accelerometers (122, 123 and 124) and three gyroscopes (126, 127 and 128); however, the number and type of sensors may be varied depending on the accuracy desired and the environment in which writing instrument 10 is used. In one embodiment, tracking sensors 120 provide movement and acceleration in three directions (e.g., x, y and z) with respect to the fixed frame of the position tracking system.

Pen tip 180 and accelerometers 122, 123 and 124 are used to determine when the writing instrument is touching writing surface 190. In such an embodiment, only the strokes made when pen tip 180 is touching writing surface 190 are processed. Of course, other embodiments are also possible, such as allowing a user to write in the air, with indications of which strokes are to be processed provided in another way, such as the user pressing a button or activating a switch either on or off writing instrument 10.

Battery 130 provides power to tracking sensors 120, transmitter/receiver 140, display 150 and any other components of writing instrument 10 that may require power. Transceiver 140 transmits data from tracking sensors 120 and other data to remote computing device 175. Transceiver 140 may also receive data from remote computing device 175. LED/LCD 150 provides feedback to the user. Remote computing device 175 may be a personal computer, a fax machine, or other computing device.

To use writing instrument 10, a user writes a message on writing surface 190. Pen tip 180 and ink supply 110 allow the user to write a message as he or she normally would write on a piece of paper. As noted above, recording the message on writing surface 190 is not necessary; however, doing so provides the user with a copy of the message written for his or her records.

As the user writes out a message, tracking sensors 120 monitor the strokes made to record the message written in the form of a series of strokes. Data from tracking sensors 120 are transmitted to remote computing device 175 via transceiver 140. Alternatively, the data from tracking sensors 120 may be processed and stored in writing instrument 10.

When a stroke is being made with writing instrument 10, tracking data from tracking sensors 120 are recorded and processed. In one embodiment, the stroke data output by the tracking sensors 120 are voltages. For accelerometers 122, 123 and 124, the voltages output are proportional to the accelerations measured in each of three directions (e.g., x, y and z) with respect to the moving frame of writing instrument 10. When writing instrument 10 is at rest, these accelerations consist of the force of gravity ($-9.81$ m/sec$^2$). For gyroscopes 126, 127 and 128, the voltages output are proportional to the angular velocity of writing instrument 10 in each of three directions (e.g., x, y and z) with respect to the moving frame of writing instrument 10.

Voltage levels generated by the sensors (both accelerometers and gyroscopes) are transmitted to remote computing device 175 which maps the data to positions of writing instrument 10. Transmission of the voltage levels may be accomplished, for example, by sampling the sensor output voltage levels with an analog-to-digital converter and sending the digital information to computing device 175 via transceiver 140. Computing device 175 receives the digital information representing voltage levels output by the sensors and determines the position of writing instrument 10.

Prior to writing a message with writing instrument 10, calibration of the tracking system is performed by placing writing instrument 10 in known positions taking sensor readings. The sensor readings obtained at the known positions are used to define the known positions. Computing device 175 maps other sensor outputs to writing instrument positions by interpolation based on the sensor outputs at the predetermined positions. Interpolation is performed by a polynomial approximation or other transform or neural network interpolation.

After calibration, voltage level information received by computing device 175 is mapped to positions of writing instrument 10. By determining the position of writing instrument 10, computing device 175 determines strokes made with writing instrument 10. Graphical representations of strokes are generated and output as a graphical display, a fax message, or for another purpose.

Alternate implementations of a position sensor system described as used in a writing instrument is disclosed are a patent application entitled "MANUAL ENTRY INTERACTIVE PAPER AND ELECTRONIC DOCUMENT HANDLING AND PROCESSING SYSTEM" filed Nov. 1, 1995, application Ser. No. 08/551,535, now U.S. Pat. No. 6,081, 261.

Position Tracking

In one embodiment, tracking of the position of writing instrument 10 is accomplished via an Euler transform. The Euler transform provides for transforming the output of tracking sensors 120 into data that defines strokes made by the user with writing instrument 10. The Euler transform is a series of three frame rotations, starting with a $\psi$ radian rotation about the z-axis of a global (fixed) frame to produce frame 1. Then frame 1 is rotated $\theta$ radians about its y-axis to produce frame 2 and finally frame 2 is rotated $\phi$ radians about its x-axis to reach the writing instrument frame. In one embodiment, frame rotations are performed as described above; however, frame rotations may be performed in a different order depending, for instance, on which frame is desired to have the greatest accuracy.

A Euler transform is used to transform acceleration and angular velocity data into position data based on accelerations and velocities from a known location. The Euler transform is commonly used in the fields of aerial and naval navigation. When used for navigation, the Euler transform is not calculated with the precision that is required for tracking of a writing instrument.

In order to recreate strokes made with writing instrument 10 from data provided by the Euler transform, accelerations are integrated twice to determine distance relative to a starting position. Gyroscopes 126, 127 and 128 in writing instrument 10 are used to correct for accelerations induced by angular rotations of writing instrument 10 as writing instrument 10 is moved. As mentioned above, the computation required may be performed by components of writing instrument 10 or by a remote device, such as remote computing device 175 in FIG. 1. Also, computations may be performed by hardware or software.

To convert accelerations in the writing instrument frame, $$[\ddot{x}_w, \ddot{y}_w, \ddot{z}_w],$$

into accelerations in the global frame, $$[\ddot{x}_g, \ddot{y}_g, \ddot{z}_g],$$

the following (Euler) transform is used:

$$\begin{bmatrix} \ddot{x}_g \\ \ddot{y}_g \\ \ddot{z}_g \end{bmatrix} = \begin{pmatrix} \cos\theta\cos\psi & \sin\phi\sin\theta\cos\psi - \cos\phi\sin\psi & \cos\phi\sin\theta\cos\psi + \sin\phi\sin\psi \\ \cos\theta\sin\psi & \sin\phi\sin\theta\sin\psi + \cos\phi\cos\psi & \cos\phi\sin\theta\sin\psi - \sin\phi\cos\psi \\ -\sin\theta & \sin\phi\cos\theta & \cos\phi\cos\theta \end{pmatrix} \begin{bmatrix} \ddot{x}_w \\ \ddot{y}_w \\ \ddot{z}_w \end{bmatrix} \quad \text{Equation 1}$$

or $$\begin{bmatrix} \ddot{x}_g \\ \ddot{y}_g \\ \ddot{z}_g \end{bmatrix} = E^{-1} \begin{bmatrix} \ddot{x}_w \\ \ddot{y}_w \\ \ddot{z}_w \end{bmatrix}. \quad \text{Equation 2}$$

The dependence of the angles and sensor signals on time has been omitted to simplify the notation. The writing instrument frame is continuously moving, and sensor outputs are mapped into a global frame. Sensor outputs are mapped at each time step. Time steps are chosen according to the resolution desired, for example, 0.25 seconds.

Tracking of a writing instrument is more fully described in a U.S. patent application entitled "METHOD AND APPARATUS FOR TRANSFORMING SENSOR SIGNALS INTO GRAPHICAL IMAGES", application Ser. No. 08/996,537, filed Dec. 23, 1997, now U.S. Pat. No. 6,212, 296, assigned to the corporate assignee of the present invention.

In addition to basic Euler position tracking, handwriting or pattern recognition may also be performed by writing instrument 10 or remote computing device 175. For example, the Euler transform parameters may be adjusted for known deviations from the true stroke. Also, other pattern recognition methods, such as Hidden Markov Modeling (HMM) or neural networks, may be used.

Tracking System Calibration

Because the writing instrument may be used in many different environments that can affect sensor output, such as temperature variations, altitude variations, etc., the present invention provides tracking system calibration. Calibration may be accomplished by putting the sensors in known positions with known acceleration components, and then using a polynomial approximation to interpolate between the (voltage, acceleration) pairs obtained at the known positions to determine the position of the writing instrument. For example, when one of the accelerometers, such as the x-axis accelerometer, is perpendicular to gravity, then the output of that accelerometer should correspond to $-9.81$ m/sec$^2$ and the other two accelerometers should correspond to 0 m/sec$^2$. When the writing instrument is rotated 90 degrees, and the x-axis accelerometer is parallel to gravity, the output should correspond to 0 m/sec$^2$. The two points obtained ($v_1$, $-9.81$) and ($v_2$, 0) can then be fit to a voltage-position line so that new voltages received represent a position of the writing instrument as determined by the voltage-position line. Similar line fits are performed for the other accelerometers. If a higher order fit is desired, more readings may be taken and higher order equations, such as quadratic equations may be used to describe the voltage-position line.

In one embodiment, sensor readings comprise voltage levels proportional to the acceleration measured by the accelerometers and to the angular velocity measured by the gyroscopes. These voltage levels may be used, for example, as inputs to analog to digital converters, the outputs of which are transmitted to a remote computing device and used to track the position(s) of the writing instrument.

Because the surface that is perpendicular to the writing instrument may not be perpendicular to gravity, two tilt angles ($\alpha, \beta$) of that surface may be included in the transform used. In one embodiment, the user of the writing instrument holds the writing instrument in three predefined positions where each of the sensors is held perpendicular to the writing surface. For each accelerometer output a slope and an intercept (m,b) is estimated to convert the voltage into an acceleration according to the equation:

$$(Acc=mV+b). \quad \text{Equation 3}$$

With these eight parameters (i.e., one slope and intercept for each of the tree accelerometers and two tilt angles) the following set of equations is solved. Case 1: x-accelerometer perpendicular to the writing surface:

$$g \cos\alpha \cos\beta - \ddot{x}_p m_x - b_x = 0, \quad \text{Equation 4}$$

$$-g \sin\alpha - \ddot{y}_p m_y - b_y = 0, \text{ and} \quad \text{Equation 5}$$

$$-g \sin\beta - \ddot{z}_p m_z - b_z = 0. \quad \text{Equation 6}$$

Case 2: y-accelerometer perpendicular to the writing surface:

$$g \sin\alpha - \ddot{x}_p m_x - b_x = 0, \quad \text{Equation 7}$$

$$g \cos\alpha \cos\beta - \ddot{y}_p m_y - b_y = 0, \text{ and} \quad \text{Equation 8}$$

$$-g \sin\beta - \ddot{z}_p m_z - b_z = 0. \quad \text{Equation 9}$$

Case 3: z-accelerometer perpendicular to the writing surface:

$$g \sin\alpha - \ddot{x}_p m_x - b_x = 0, \quad \text{Equation 10}$$

$$g \sin \beta - \bar{y}_p m_y - b_y = 0,$$ Equation 11

$$g \cos \alpha \cos \beta - \bar{z}_p m_z - b_z = 0.$$ Equation 12

A solution set for the eight parameters may be found by squaring each of the left hand sides of Equations 4–12, adding the results together, and then reducing the resulting equation with respect to each parameter. This may be implemented in either hardware or software.

The solution set for the eight parameters discussed above provides a mapping that allows sensor readings to be mapped to corresponding writing instrument positions. The mapping provided by Equations 4–12 is a linear mapping. Higher order mappings may be accomplished with more sensor readings in additional predefined positions.

Physical Shape of the Writing Instrument

In order to simplify calibration for the user, writing instrument 10 may have one or more flat surfaces. These surfaces are held against the writing surface to obtain calibration readings for the sensors. After the readings are taken, the calibration calculations described above are performed with the sensor readings. The result of the calibration readings are then used to calibrate the tracking system.

Alternatively, a stand or protractor-type device may be used to hold the writing instrument in known positions. In such an implementation, the writing instrument would not have to have flat surfaces for calibration purposes.

Figure 2:
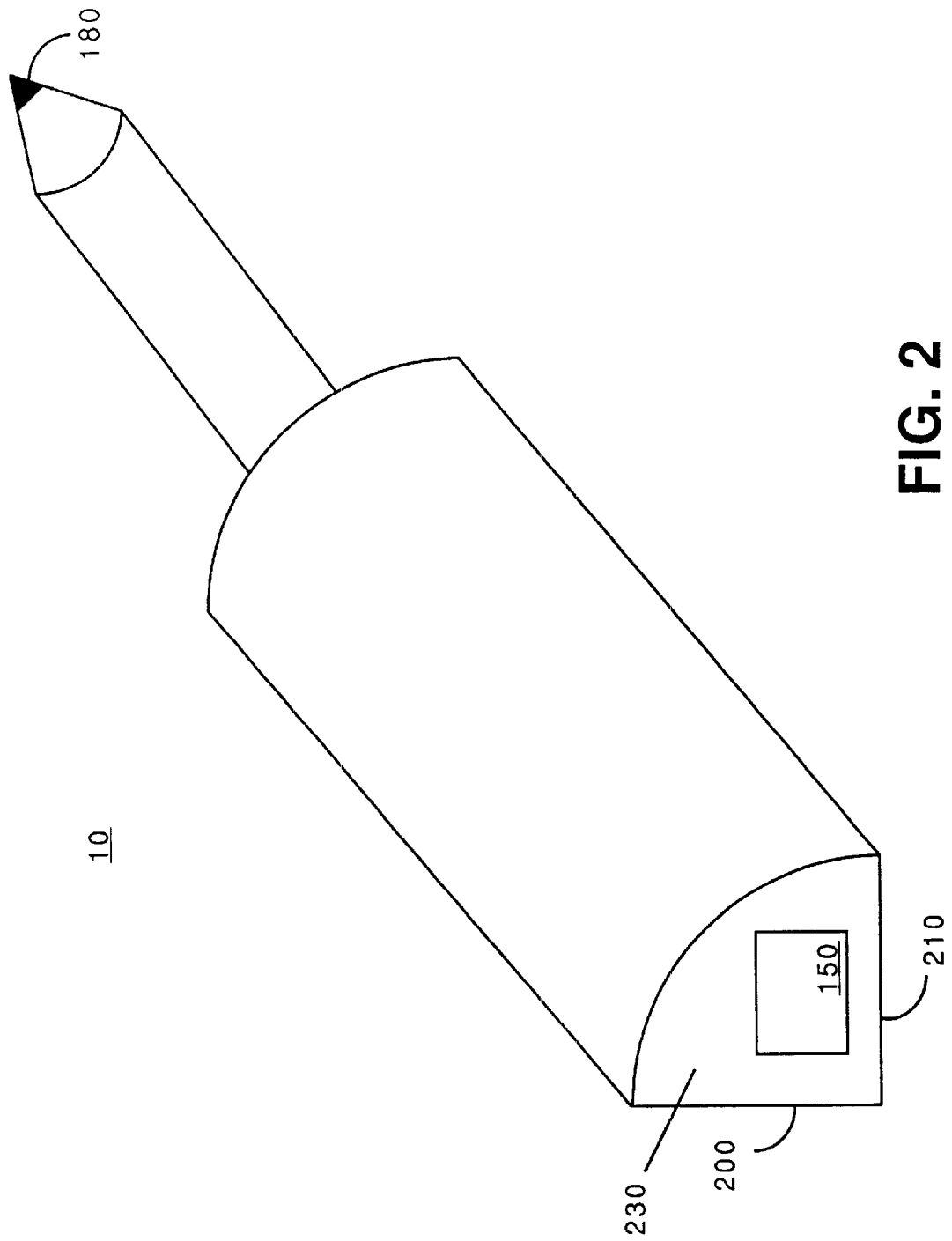
FIG. 2 is a perspective view of one embodiment of a writing instrument having three calibrating surfaces according to the present invention.

FIG. 2 is a perspective view of one embodiment of a writing instrument having three calibrating surfaces. Writing instrument 10 has three calibration surfaces 200, 210 and 230. The calibration sequence is described below with respect to a particular sequence and angle between calibration surfaces; however, other angles and sequences may be used. In any case, the information that is known prior to a successful calibration sequence is the angular relationship between the calibration surfaces.

The user of writing instrument 10 first holds calibration surface 200 against a writing surface. In the case of a writing surface that is a pad of paper on a desk, the user simply places writing instrument 10 on the pad of paper with calibration surface 200 down. Writing instrument 10 is in this position for a period of time long enough to allow for stable sensor readings. In one embodiment, this period of time is 0.3 seconds; however, other times may be used depending on the accuracy and speed of the tracking system. If the writing surface is at an angle, the writer may physically hold the writing instrument in place to prevent writing instrument 10 from sliding.

After writing instrument 10 has been placed on calibration surface 200, it is placed on calibration surface 210. In one embodiment, calibration surface 210 is at a right angle to calibration surface 200. Having calibration surfaces 200 and 210 at right angles allows the forces on writing instrument 10 placed on a level surface to work only in one direction. In other words, gravity is only measured along the x-axis, such that the y-axis and z-axis accelerometers sense no accelerations. A right angle between calibration surfaces simplifies the calibration computations.

The final calibration surface is calibration surface 230, which is the top surface of writing instrument 10. In one embodiment, calibration surface 230 is at right angles to both calibration surface 200 and calibration surface 210. After readings are taken with each calibration surface 200, 210 and 230 on the writing surface, the calibration equations described above are evaluated and the output of the sensors in writing instrument 10 are calibrated.

Figure 3:
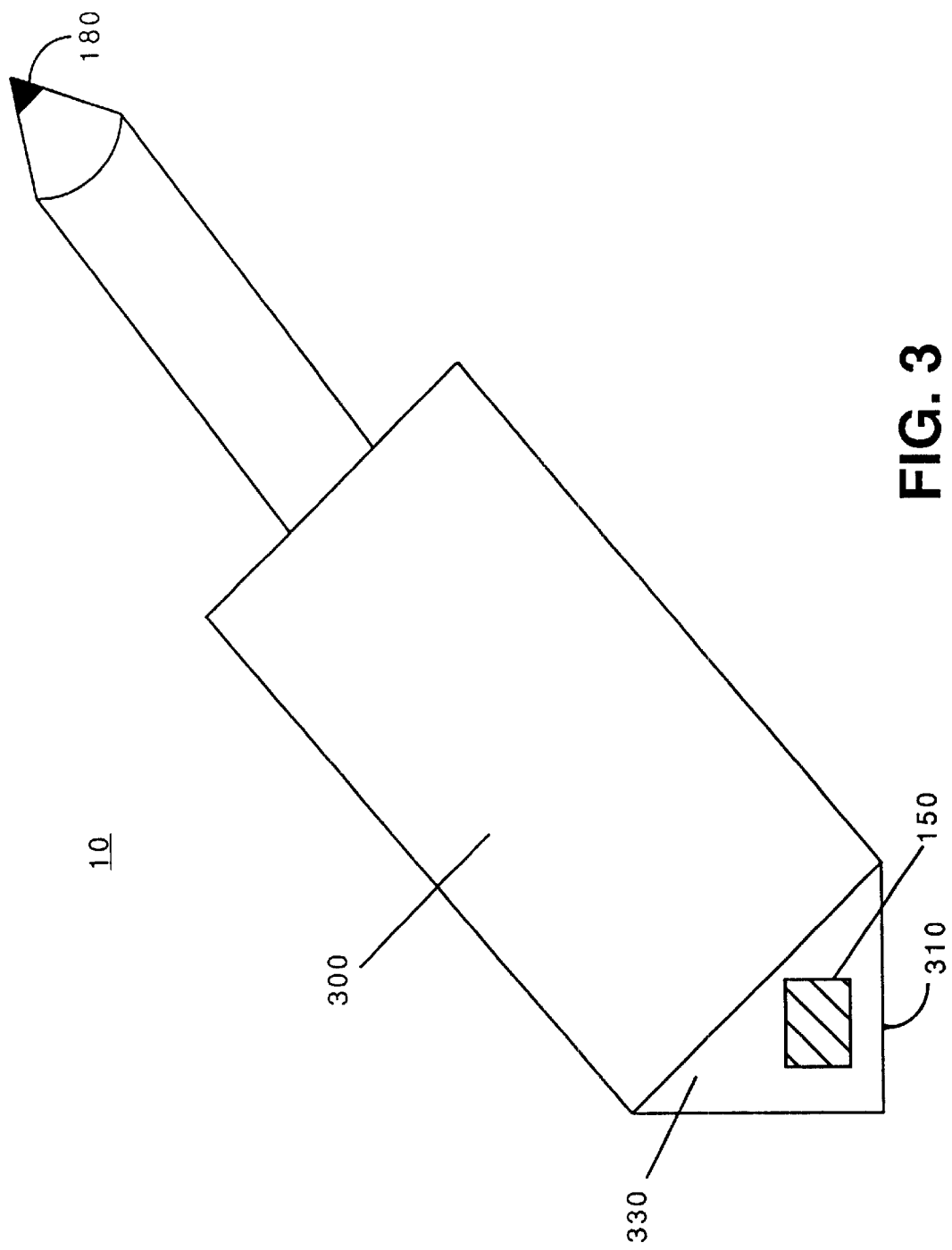
FIG. 3 is a perspective view of one embodiment of a writing instrument having four calibrating surfaces according to the present invention.

FIG. 3 is a perspective view of one embodiment of a writing instrument having four calibrating surfaces. The embodiment of FIG. 3 provides a higher order fit between voltage and accelerations because more readings are taken. As with the embodiment of FIG. 2, the calibration sequence is discussed in a particular order and with a particular relationship between the sides; however, other sequences and relationships may also be used.

Three of the four calibration surfaces are calibration surface 300, calibration surface 310 and calibration surface 320 connected to form a triangular upper portion of writing instrument 10. The fourth calibration surface 330 forms the upper surface of writing instrument 10 and is at a right angle to each of the other three calibration surfaces. Because the three calibration surfaces forming the triangular walls of the upper portion of writing instrument 10 are not at right angles to each other the evaluation of the calibration equations above is more complex than in the case of right angles; however, more information is provided and may be desired to improve the accuracy of the writing instrument tracking. In the embodiment of FIG. 3, Equations 4–12 are modified to compensate for the angles between the calibration surfaces because Equations 4–12 assume right angle relationships.

As is shown in the discussion above, any number of calibrating surfaces or positions may be used. What is required is that the relationship between the positions is known. With this information and readings from the sensors, calibration of the sensors may be performed.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An apparatus for tracking movement of an input device comprising:

means for obtaining sensor readings for each of a plurality of predefined positions of the input device with respect to a writing surface;

means for generating a mapping of possible sensor outputs to possible input device positions based on the sensor readings at the predetermined positions;

means for mapping a first voltage output by a first sensor when the input device is in a first predetermined position with respect to the writing surface;

means for mapping a second voltage output by a second sensor when the input device is in a second predetermined position with respect to the writing surface; and means for mapping sensor output voltages between the first voltage and the second voltage to positions of the input device between the first predetermined position and the second predetermined position.

2. The apparatus of claim 1 further comprising:

means for mapping a third voltage output by a third sensor when the input device is in a third predetermined position with respect to the writing surface; and means for interpolating sensor output voltages between the second voltage and the third voltage to positions of the input device between the second predetermined position and the third predetermined position.

3. An apparatus, comprising:

means for obtaining sensor readings for each of a plurality of predefined positions of a writing instrument;

means for generating a mapping of sensor outputs to writing instrument positions based, at least in part, on the sensor readings at the plurality of predefined positions with respect to the writing surface; and means for generating a mapping of possible sensor outputs to possible writing instrument positions comprising means for determining a polynomial approximation of future writing instrument positions corresponding to future sensor outputs based on sensor outputs at the predetermined positions, wherein the polynomial approximation includes the sensor outputs for each predefined position.

4. The apparatus of claim 3, further comprising means for changing the mapping of possible sensor outputs to possible writing instrument positions to compensate for an angle of a writing surface.

5. The apparatus of claim 3, further comprising means for changing the mapping of possible sensor outputs to possible writing instrument positions based on measurable deviations of a mapped position to a known position.

6. A machine readable medium having stored thereon instructions, which when executed by a processor, cause the processor to perform the following comprising:

obtaining sensor readings for each of a plurality of predefined positions of the input device with respect to a writing surface;

generating a mapping of possible sensor outputs to possible input device positions based on the sensor readings at the predetermined positions;

mapping a first voltage output by a first sensor when the input device is in a first predetermined position with respect to the writing surface;

mapping a second voltage output by a second sensor when the input device is in a second predetermined position with respect to the writing surface; and mapping sensor output voltages between the first voltage and the second voltage to positions of the input device between the first predetermined position and the second predetermined position.

7. The machine readable medium of claim 6, wherein the processor further performs the following comprising:

mapping a third voltage output by a third sensor when the input device is in a third predetermined position with respect to the writing surface; and interpolating sensor output voltages between the second voltage and the third voltage to positions of the input device between the second predetermined position and the third predetermined position.

8. A machine readable medium having stored thereon instructions, which when executed by a processor, cause the processor to perform the following comprising:

obtaining sensor readings for each of a plurality of predefined positions of a writing instrument;

generating a mapping of sensor outputs to writing instrument positions based, at least in part, on the sensor readings at the plurality of predefined positions with respect to the writing surface; and generating a mapping of possible sensor outputs to possible writing instrument positions comprising means for determining a polynomial approximation of future writing instrument positions corresponding to future sensor outputs based on sensor outputs at the predetermined positions, wherein the polynomial approximation includes the sensor outputs for each predefined position.

9. The machine readable medium of claim 8, wherein the processor further performs the following comprising changing the mapping of possible sensor outputs to possible writing instrument positions to compensate for an angle of a writing surface.

10. The machine readable medium of claim 8, wherein the processor further performs the following comprising changing the mapping of possible sensor outputs to possible writing instrument positions based on measurable deviations of a mapped position to a known position.

* * * * *